(12) United States Patent
Nahum

(10) Patent No.: US 11,611,238 B2
(45) Date of Patent: Mar. 21, 2023

(54) WIRELESS CHARGING TRANSFER APPARATUS AND METHODS

(71) Applicant: PopSockets LLC, Boulder, CO (US)

(72) Inventor: Altan Nahum, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 304 days.

(21) Appl. No.: 17/145,154

(22) Filed: Jan. 8, 2021

(65) Prior Publication Data
US 2021/0218277 A1 Jul. 15, 2021

Related U.S. Application Data

(60) Provisional application No. 62/959,471, filed on Jan. 10, 2020.

(51) Int. Cl.
| | |
|---|---|
| *H02J 50/10* | (2016.01) |
| *H02J 50/70* | (2016.01) |
| *H01F 38/14* | (2006.01) |
| *H02J 50/00* | (2016.01) |
| *H02J 7/02* | (2016.01) |
| *H01F 27/36* | (2006.01) |

(52) U.S. Cl.
CPC .............. *H02J 50/10* (2016.02); *H01F 27/36* (2013.01); *H01F 38/14* (2013.01); *H02J 7/02* (2013.01); *H02J 50/005* (2020.01); *H02J 50/70* (2016.02)

(58) Field of Classification Search
CPC .. H02J 50/10; H02J 7/02; H02J 50/005; H02J 50/70; H02J 7/0042; H02J 50/12; H01F 27/36; H01F 38/14; H01F 27/02
See application file for complete search history.

(56) References Cited

U.S. PATENT DOCUMENTS

| | | | | |
|---|---|---|---|---|
| 8,560,031 | B2* | 10/2013 | Barnett | F16M 11/40 |
| | | | | 455/575.8 |
| 9,970,589 | B2* | 5/2018 | Hobbs | F16M 13/00 |
| 10,019,034 | B2* | 7/2018 | Barnett | H01R 24/86 |
| 2012/0262109 | A1* | 10/2012 | Toya | H01M 10/44 |
| | | | | 320/108 |
| 2012/0274282 | A1* | 11/2012 | Yoneyama | H02J 7/0044 |
| | | | | 320/115 |
| 2015/0137732 | A1 | 5/2015 | Lai et al. | |
| 2016/0282192 | A1* | 9/2016 | Wikstrand | G01K 1/026 |
| 2017/0104358 | A1* | 4/2017 | Song | H01F 27/08 |

(Continued)

FOREIGN PATENT DOCUMENTS

WO   WO-2020113045 A1 *  6/2020  ............... A45F 4/00

OTHER PUBLICATIONS

Transmittal of the International Search Report and Written Opinion issued in PCT/US2021/012813 dated Mar. 26, 2021.

*Primary Examiner* — Jared Fureman
*Assistant Examiner* — Michael J Warmflash
(74) *Attorney, Agent, or Firm* — Irell & Manella LLP

(57) ABSTRACT

Wireless charging transfer devices are described herein that are configured to achieve wireless charging of portable electronic devices across a gap from a wireless charger. The devices include coil configuration including a receiver coil, a transmitter coil, and a bridge electrically coupling the receiver and transmitter coils across the gap. The coil configuration can be received within a housing that can provide storage space or can incorporate an expandable grip accessory.

17 Claims, 9 Drawing Sheets

(56) References Cited

U.S. PATENT DOCUMENTS

| | | | |
|---|---|---|---|
| 2017/0288445 A1* | 10/2017 | Lee | H02J 7/04 |
| 2017/0331318 A1* | 11/2017 | Jankins | H02J 7/0044 |
| 2018/0248415 A1* | 8/2018 | Yoshizawa | H02J 50/12 |
| 2019/0074731 A1* | 3/2019 | Lee | H02J 50/60 |
| 2019/0081515 A1* | 3/2019 | Gajiwala | H02J 50/70 |
| 2019/0081517 A1* | 3/2019 | Graham | H02J 50/10 |

* cited by examiner

WIRELESS CHARGING TRANSFER APPARATUS AND METHODS

CROSS REFERENCE TO RELATED APPLICATION

This application claims the benefit of provisional application No. 62/959,471, filed on Jan. 10, 2020, the entire disclosure of which is hereby incorporated by reference.

FIELD OF THE DISCLOSURE

The present disclosure generally relates to chargers for electronic devices and, more particularly, to wireless chargers for portable electronic devices.

BACKGROUND

Wireless charging for portable electronic devices, such as smart phones, has become increasingly popular. In use, the electronic device is placed on a charging station and an electromagnetic field transfers energy from the charging station to the electronic device through electromagnetic induction or resonance. The energy is then used by the electronic device to charge a battery. Many factors can influence the effectiveness of the energy transfer, including material and space between the coils of the charging station and the electronic device Portable electronic devices can also be housed in protective covers or cases in order to protect the device from damage, provide a grip for handling the device, and/or provide a stand for propping the device on a surface. Such cases increase the effective size of the device. Further, expandable devices and accessories, which may be attached directly to the device or to the case protecting the device, are used for a variety of functions, including propping the device on a surface and providing an expandable grip for handling the device. The expandable devices have decorative buttons, which may display logos, decals, symbols, or other artistic renderings. All of these covers, cases, devices, and accessories, however, can increase the material and space between the coils of the charging station and the electronic device.

SUMMARY

A wireless power transfer apparatus is described herein that is configured to transfer power from a charging transmitter coil to a reception coil in a portable electronic device. The wireless power transfer apparatus includes a receiver coil, a transmitter coil, a bridge extending over a gap between and electrically coupling the receiver and transmitter coils to transfer power received at the receiver coil to the transmitter coil, and a housing having an upper portion receiving the receiver coil and a lower portion receiving the transmitter coil.

According to one or more forms, the bridge can be an electrical path that extends between edges of the receiver and transmitter coils and/or the housing can include a connection compartment extending between the upper and lower portions to receive the bridge therethrough and a storage area disposed between the upper and lower portions, where the storage area has an opening for access thereto. In one or more forms, the wireless power transfer apparatus can include retention members extending within an interior of the storage area to retain contents inserted into the storage area; the wireless power transfer apparatus can include shielding extending along the upper and lower portions and/or the connection compartment to shield the storage area; and/or the storage area can include sidewalls extending between the upper and lower portions, such that the opening is a lateral opening.

According to one or more forms, the bridge can be a connector coil having a spiral configuration that is selectively expandable in an axial direction. In one or more forms, the connector coil can be electrically coupled to the transmitter coil at a radially outer portion thereof and electrically coupled to the receiver coil at a generally central portion thereof and/or the housing can include an expandable sidewall extending between the upper and lower housing portions, where the connector coil is disposed within an interior of the expandable sidewall. The expandable sidewall may also have a frusto-conical configuration and/or the upper portion of the housing can be a button mounted to an end of the expandable sidewall.

According to any of the above forms, the receiver coil can be embedded within the upper portion of the housing and the transmitter coil can be embedded within the lower portion of the housing; and/or the lower portion of the housing can include one or more walls that are configured to engage a portable computing device and couple the housing to the portable computing device.

In accordance with another aspect of the disclosure, a method for transferring charging power from a transmitting coil of a wireless power supply to a receiving coil of a portable electronic device using is described that includes receiving power from the transmitting coil at a receiver coil of a wireless power transfer device, transferring the power to a transmitter coil of the wireless power transfer device through a bridge extending over a gap between the receiver coil and the transmitter coil, and transmitting the power to the receiving coil of the portable electronic device with the transmitter coil of the wireless power transfer device. In this form, the receiver coil is disposed within a upper portion of a housing for the wireless power transfer device and the transmitter coil is disposed within a lower portion of the housing.

According to one or more forms, transferring the power to the transmitter coil of the wireless power transfer device through the bridge extending over the gap between the receiver coil and the transmitter coil can include transferring the power to the transmitter coil of the wireless power transfer device through an electrical path extending between edges of the receiver and transmitter coils. In one or more forms, the method can include receiving items in a storage area of the housing disposed between the upper and lower portions, where the storage area has an opening for access thereto. In yet further forms, the method can include shielding the storage area with shield members extending along the upper and lower portions.

According to one or more forms, transferring the power to the transmitter coil of the wireless power transfer device through the bridge extending over the gap between the receiver coil and the transmitter coil can include transferring the power to the transmitter coil of the wireless power transfer device through a connector coil with opposite ends electrically coupled to the transmitter and receiver coils, where the connector coil has a spiral configuration that is selectively expandable in an axial direction. In one or more forms, the method can include expanding a sidewall of the housing extending between the upper and lower portions thereof, where the connector coil is disposed within an interior of the expandable sidewall such that expanding the sidewall causes the connector coil to expand in the axial direction.

According to any of the above forms, the method can include coupling the lower portion of the housing to a portable computing device.

DETAILED DESCRIPTION

Generally speaking, pursuant to various embodiments, wireless charging devices and methods are provided that advantageously provide stable and effective portable charging of portable electronic devices around or through a gap. The devices utilize intermediate receiver and transmitter coils to act as a bridge to transfer power from a transmitter coil, in a charging station for example, to a receiver coil in the portable electronic device.

The intermediate receiver and transmitter coils can be received within a housing that defines the gap, which can advantageously be utilized for storage, including credit or debit cards, or other typical wallet contents, so that contents can be easily inserted and removed. In some versions, the housing can include a case on one side thereof to hold and protect the electronic device. In other forms, the gap can be due to an outwardly protruding attachment mounted to the portable electronic device, such as a grip attachment. In some versions, the grip attachment can be an expandable device that includes a base and an expanding mechanism that is movable relative to the base between a collapsed configuration and an expanded configuration. The expandable device may further include a button coupled to the expanding mechanism.

Figure 1:
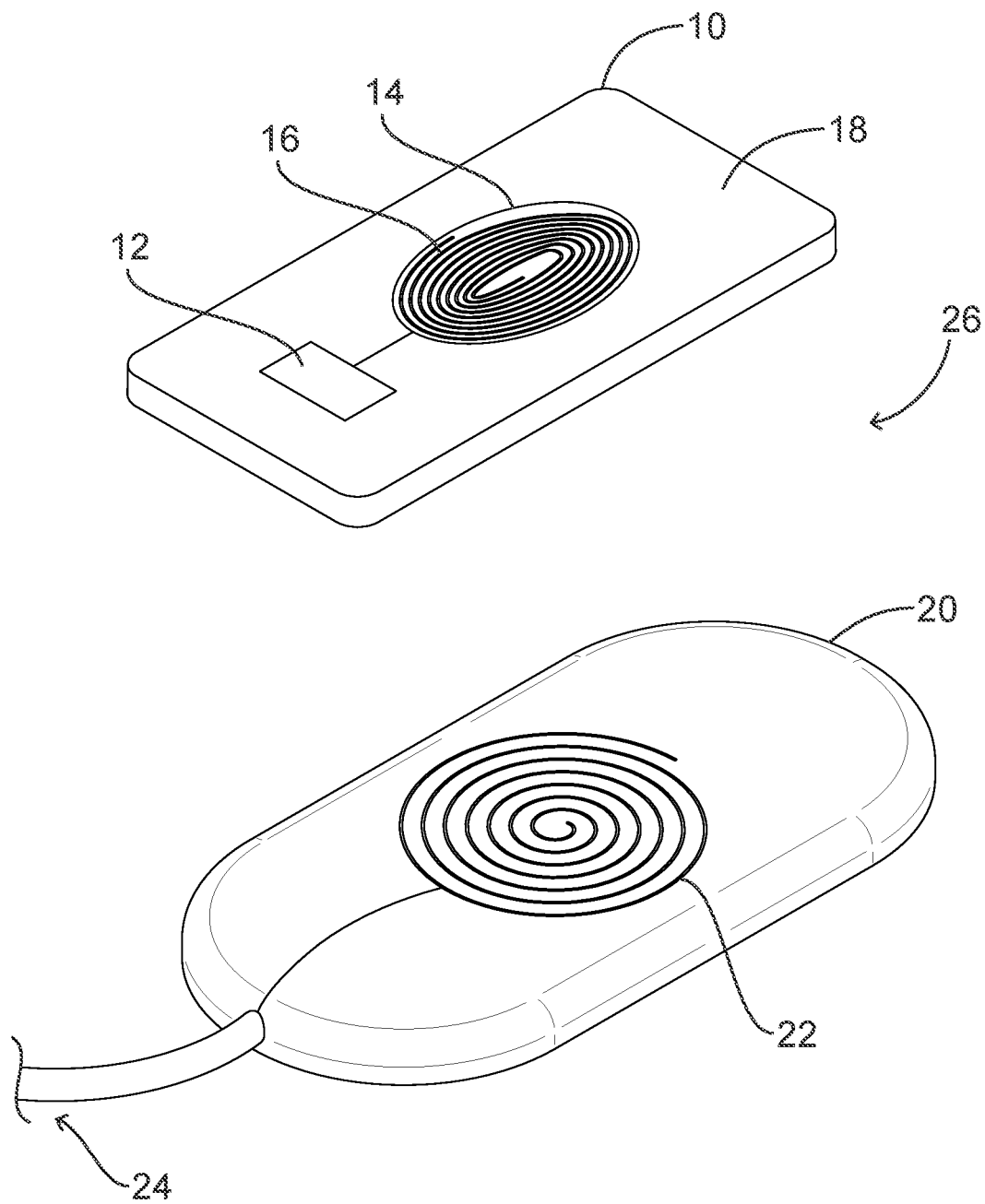
FIG. 1 is a perspective diagrammatic view of a portable electronic device and a wireless charger.

As shown in FIG. 1, the wireless charging devices and methods described herein are configured to charge a suitable portable electronic device 10, such as a smart phone, tablet, e-reader, and the like. The portable electronic device 10 includes electronic components powered by a battery or other suitable power storage 12 and a receiver coil 14 electrically coupled to the power source 12. The receiver coil 14 has a disk-shaped configuration with main surfaces 16 that extend in a direction generally parallel with respect to main surfaces 18 of the device 10. So configured, the portable electronic device 10 can receive charging power from a wireless charger 20 having a transmitter coil 22 and being electrically coupled to a power supply 24. With this configuration, a user can align the receiver coil 14 of the portable electronic device 10 with the transmitter coil 22 of the wireless charger 20 to thereby charge the power source 12 via inductive power supplied by the transmitter coil 22 and received at the receiver coil 14. As set forth above, however, the coils 14, 22 must be sufficiently aligned and be within a relatively close range of one another. As such, when the portable electronic device 10 is spaced from the wireless charger 20 by a gap 26, the portable electronic device 10 may not charge sufficiently.

Wireless charging transfer devices 100 suitable to provide wireless charging power to a portable electronic device 10 across the gap 26 are shown in FIGS. 2-7. The devices 100 described herein include receiver and transmitter coils 102, 104 that are electrically connected together by a bridge 106 extending therebetween. The receiver coil 102, the transmitter coil 104, and the bridge 106 are received within a housing 108 of the device 100. In the illustrated form, the housing 108 includes a lower portion 110 sized to receive the receiver coil 102, an upper portion 112 sized to receive the transmitter coil 104, and a connection portion 114 extending between the lower and upper portions 110, 112. The connection portion 114 spans the gap 26 and receives the bridge 106 therein to allow the bridge 106 to electrically connect the coils 102, 104 together. The lower and upper portions 110, 112 can have the coils 102, 104 embedded therein or can include cavities sized to receive the coils 102, 104. By virtue of the intermediary coils 102, 104 and the bridge 106, the devices 100 described herein allow the power source 12 of the portable computing device 10 to be charged by the wireless charger 20 despite the gap 26 therebetween. Pursuant to this, the lower housing portion 110 is configured to rest on the wireless charger 20 to align the receiver coil 102 with the transmitter coil 22 of the wireless charger 20. Similarly, the upper housing portion 112 is configured to receive the portable electronic device 10 thereon or couple thereto to align the transmitter coil 104 with the receiver coil 14 of the device 10. For example, the coils described herein can be configured to operate in the Qi standard. Other suitable standards can alternatively be utilized. In the illustrated form, the lower housing portion 110 includes a generally planar outer surface portion 111 that allows the housing 108 to stably rest on the wireless charger 20. The upper housing portion 112 can include a similar planar outer surface portion 113 to receive the device 10 thereon.

Figure 2:
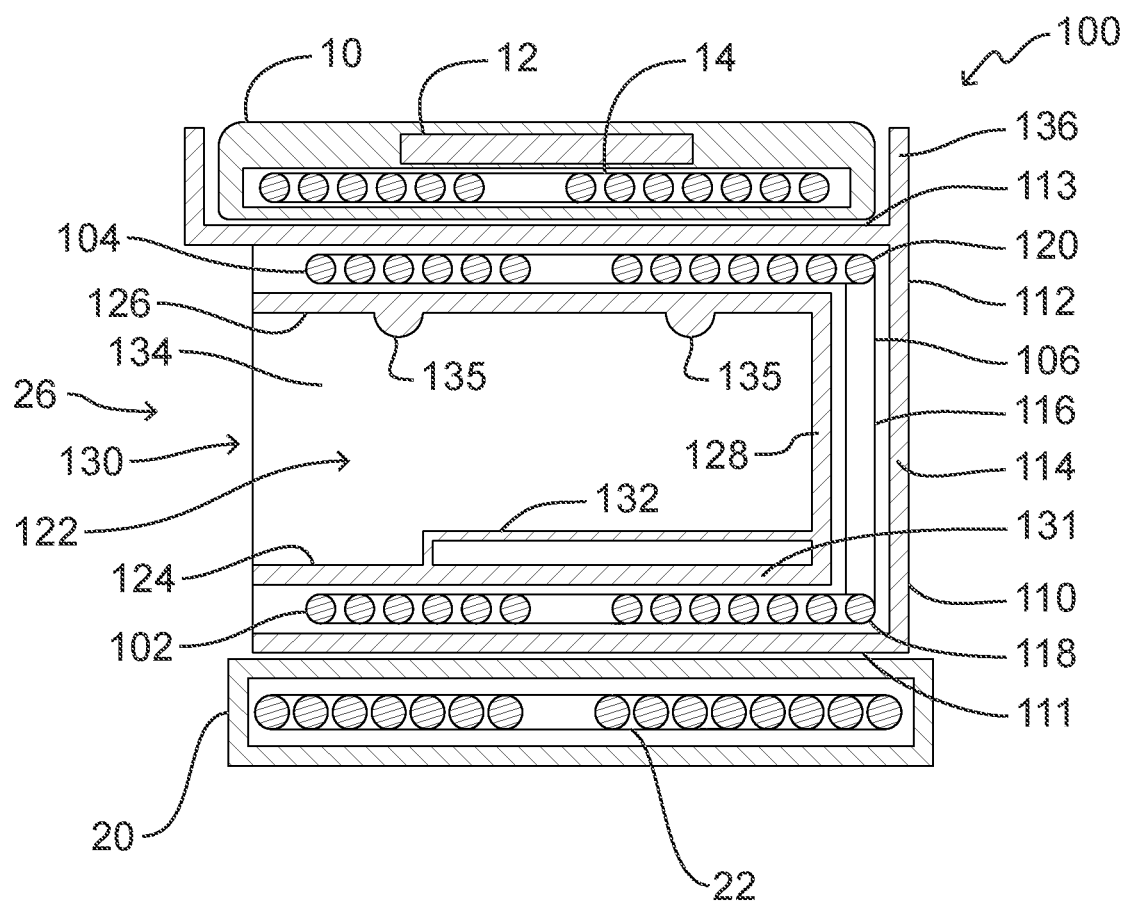
FIG. 2 is a cross-sectional view of a wireless charging transfer device configured in accordance with the principles of the disclosure to charge a portable electronic device from a wireless charger across a gap.
Figure 3:
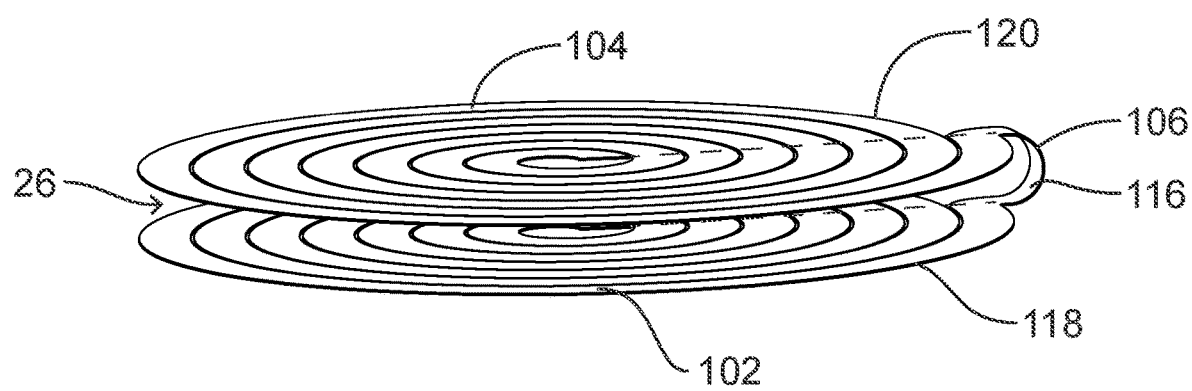
FIG. 3 is a perspective view of a coil configuration configured in accordance with the principles of the disclosure for the wireless charging transfer device of FIG. 2.

As shown in FIGS. 2 and 3, the bridge 106 may be an electrical path 116 connecting radial edges 118, 120 of the receiver and transmitter coils 102, 104, respectively. With this configuration, the gap 26 at least partially defines a storage area 122 disposed between the lower and upper portions 110, 112 of the housing 108. In the illustrated form, the storage area 122 is enclosed by top and bottom walls 124, 126 and a rear wall 128 and accessible through an opening 130. As shown, the top and bottom walls 124, 126 are portions of the upper and lower portions 112, 110 of the housing 108 and the rear wall 130 is a portion of the connection portion 114 of the housing 108. The storage area 122 advantageously allows a user to insert cards, excess grip accessories, table tops, battery modules, circuit boards, cases, stands, or other materials into the housing 108 through the opening 130. If desired, the housing 108 can further include shielding 131 that shields the storage 122 from electromagnetic fields generated by the receiver and/or transmitter coils 102, 104. As such, the shielding 131 can extend along or within the lower portion 110, the upper portion 112, and/or the connecting portion 114. The shielding 131 can be separate or attached members. In one example, the shielding 131 can include ferrite, which can have a rigid or flexible configuration, as desired.

In some forms, portions of the housing 108 can be made from a flexible material. For example, the connecting portion 108 can be flexible so that the lower and upper portions 110, 112 can be pivoted with respect to one another. With this configuration, the housing 108 can provide a storage area 122 that functions similar to a bi-fold wallet. Pursuant to this, the top and/or bottom walls 124, 126 can have one or more pockets 132 formed therein or coupled thereto to provide convenient storage locations within the storage area 122. Alternatively, the connecting portion 108 can be made from a rigid material, such that the lower and upper portions 110, 112 are fixed in place relative to one another. In the illustrated form, the lower and upper portions 110, 112 extend generally parallel to one another. In these forms, the storage area 122 can further be defined by sidewalls 134 extending between the lower and upper portions 110, 112 and connecting to the rear wall 128. So configured, the opening 130 is a lateral opening that provides access to the storage area 122. Further, the shielding 131 can also extend along or within the sidewalls 134, such that in some forms, the storage area 122 is fully encapsulated by the shielding 131 other than the opening 130. If desired, the top and/or bottom walls 124, 126 can include inwardly extending retention members 135 that are configured to grip contents inserted into the storage area 122. For example, the retention members 135 can be made of a rubber or tacky plastic material.

As discussed above, the coils 102, 104 can be embedded within the lower and upper portions 110, 112 or received within cavities formed thereby. Alternatively, in this form, the coils 102, 104 can be disposed on external or internal surfaces with respect to the storage area 122 of the lower and upper portions 110, 112. For example, the coils 102, 104 can be adhered to the surfaces or otherwise coupled thereto. Suitable materials for the housing 108 include polycarbonate, high-density polyethylene (HDPE), nylon, thermoplastic polyurethane (tpu) rubber, and other suitable polymers.

Advantageously, the lower portion 110 of the housing 108 can include one or more walls 136 that are sized and configured to engage the portable computing device 10 to couple the housing 108 to the device 10. For example, the walls 136 can be configured to engage side and/or front surfaces of the device 10 to secure the housing 108 thereto. For example, the walls 136 can be inwardly slanted and/or provided with a lip to engage the device 10 and can have resilient and/or flexible configurations for mounting the housing 108 to the device 10, as commonly understood. Although the housing 108 is shown in a single-piece configuration, the walls defining the storage area 122 can be removably attached to the walls coupling the housing 108 to the portable electronic device 10. This would allow a user to remove the storage area 122 from being attached to the portable electronic device 10, as may be convenient to access the storage area 122, such as with a wallet.

With this configuration, the upper portion 112 extends along and over the device 10 to align the transmitter coil 104 with the receiver coil 14 of the device 10. The housing 108 can be utilized to protect the portable electronic device 10 against physical damage. So configured, the housing 108 can function as both a case to protect the portable computing device 10 and as a wallet or other storage. Moreover, due to the coils 102, 104 and bridge 106, the portable computing device 10 can be charged when the device 10 and the housing 108 are positioned on the wireless charger 20 similar to if the device 10 was placed directly on the wireless charger 20.

Figure 4:
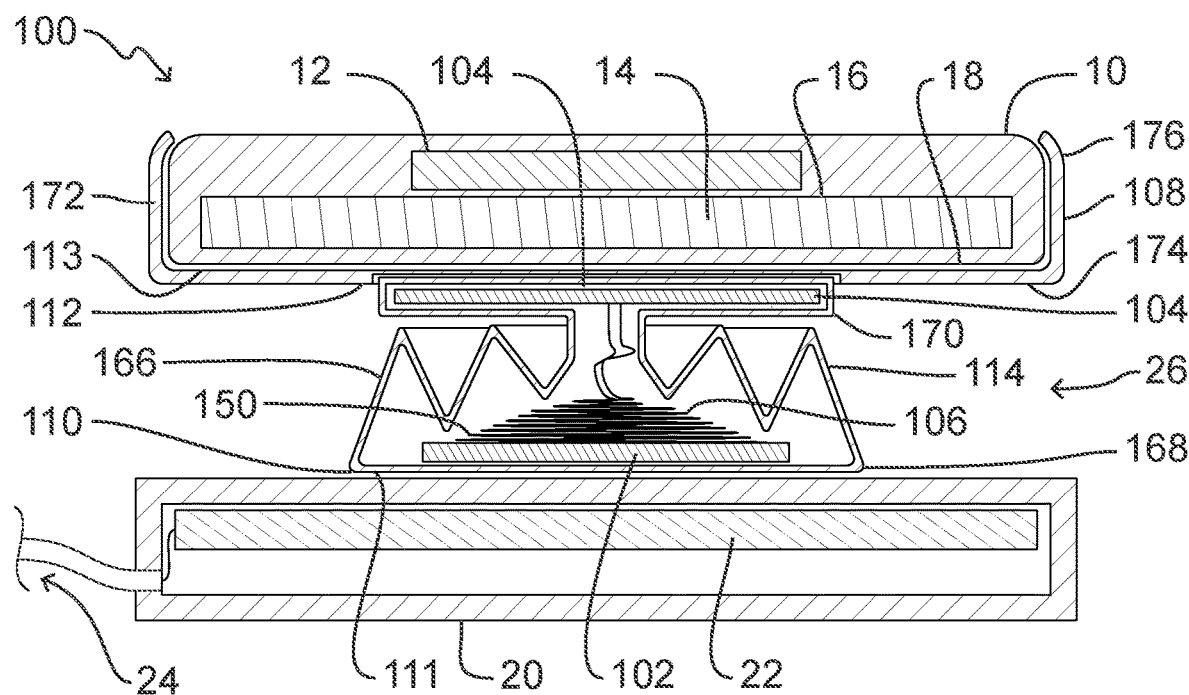
FIG. 4 is a cross-sectional view of a wireless charging transfer device configured in accordance with the principles of the disclosure to charge a portable electronic device from a wireless charger across a gap with an expandable grip accessory in a collapsed state.
Figure 5:
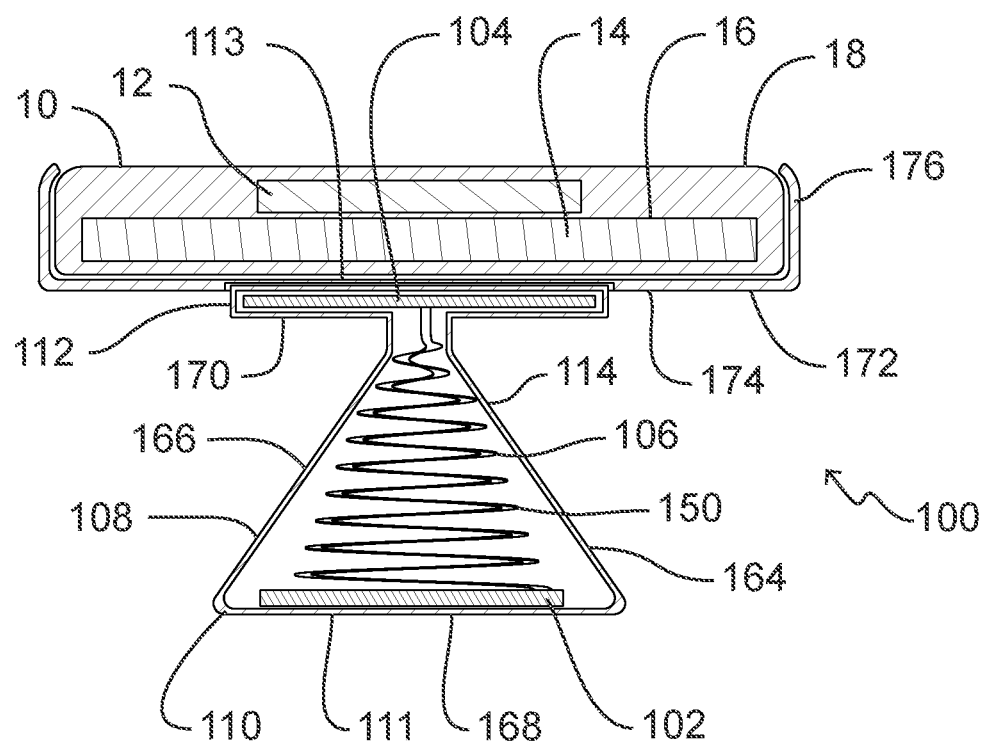
FIG. 5 is a cross-sectional view of the wireless charging transfer device with the expandable grip accessory in an expanded state.
Figure 6:
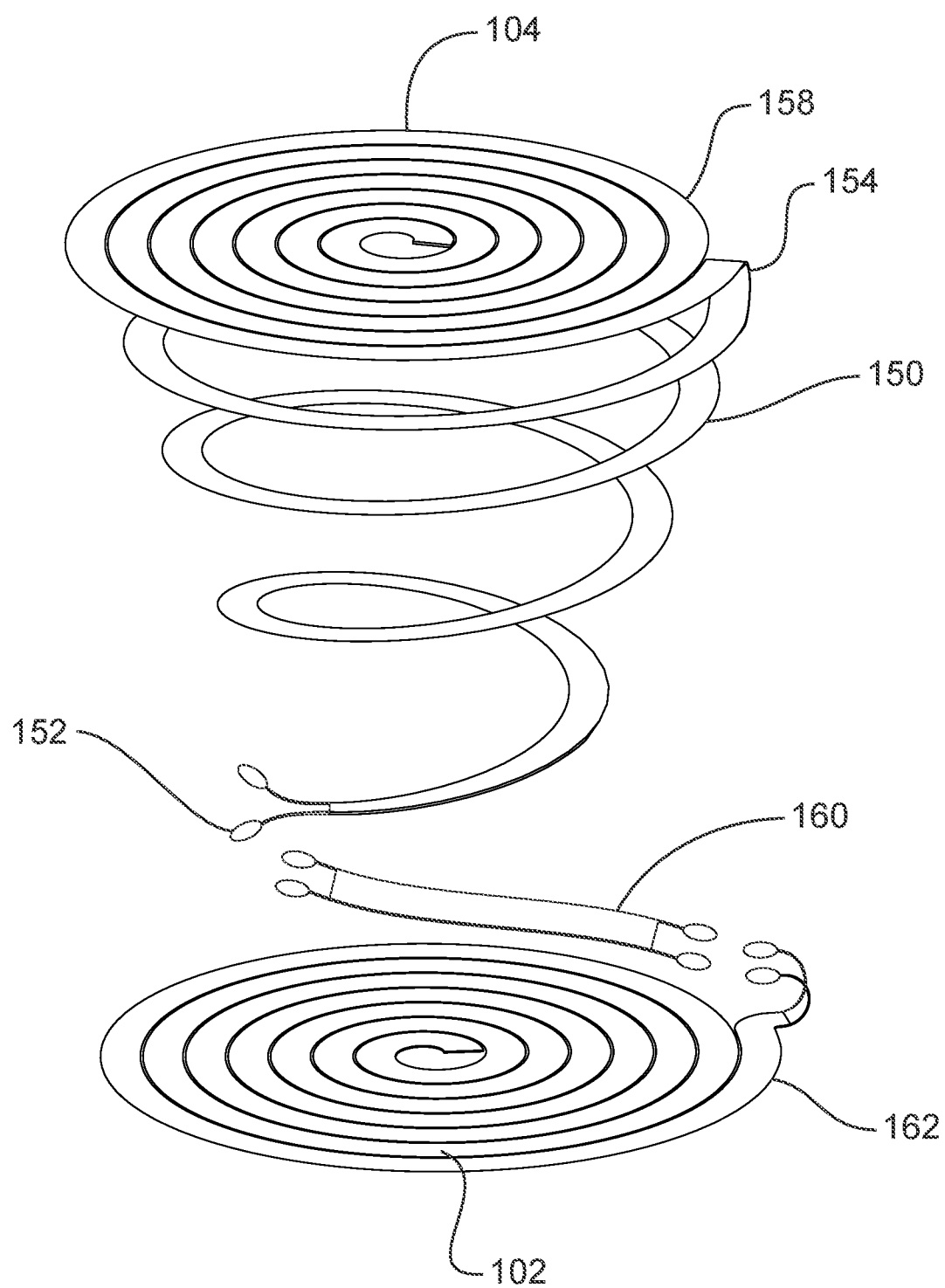
FIG. 6 is a perspective view of a coil configuration configured in accordance with the principles of the disclosure for the wireless charging transfer device of FIG. 5.
Figure 7:
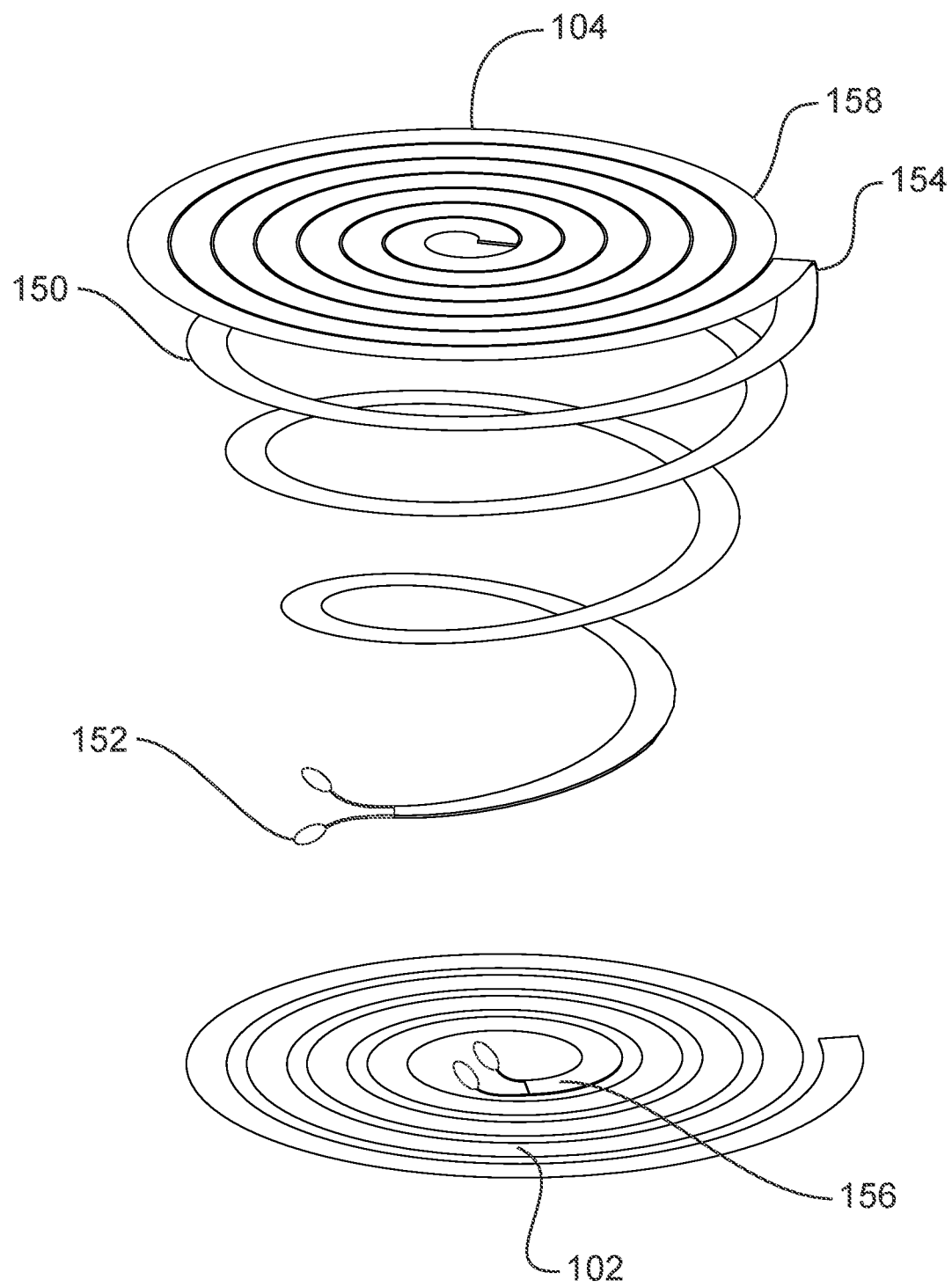
FIG. 7 is a perspective view of a coil configuration configured in accordance with the principles of the disclosure for the wireless charging transfer device of FIG. 5.

As shown in FIGS. 4-7, the bridge 106 may be a coil member 150 having a spiral shape so as to have a generally planar configuration in a first state. With this configuration, the coils of the spiral can be moved in an axial direction to an expanded state. For example, as shown in FIG. 5, with a center end 152 of the member 150 moved in the axial direction relative to a radial end 154 of the coil member 150, the member 150 has a conical shape in the expanded state. The expansion of the coil member 150 allows the receiver and transmitter coils 102, 104 can be moved axially away from one another while maintaining an electrical connection therebetween. In one version, as shown in FIG. 7, the center end 152 can electrically couple to a center 156 of the receiver coil 102 and the radial end 154 can electrically couple to a radial edge 158 of the transmitter coil 104. In another version, as shown in FIG. 6, a connector 160 can electrically couple the center end 152 to a radial edge 162 of the receiver coil 102.

As shown in FIGS. 4 and 5, the housing 108 includes a grip attachment 164 having an expandable sidewall 166 as the connecting portion 114 that extends between a button 168 forming the upper portion 112 and the lower portion 110. The sidewall 166 is movable between an expanded, use configuration and a collapsed, storage configuration with an accordion-like structure. The sidewall 166 can be made of a flexible material, such as polyester-based thermoplastic polyurethane elastomer, that may be formed by injection molding, thermoforming, or compression molding, or may be any equivalently functional material suitable for its intended purpose. As shown, the bridge 106 is received within an interior of the sidewall 166 such that the coil member 150 expands as a user expands the sidewall 166. The expandable sidewall 166 can have a frusto-conical configuration in the expanded state as shown in FIG. 5. Of course, other shapes, such as a cylinder, box, or other polygonal cross-sections can be utilized.

In some versions, the lower portion 110 can be a platform 170 coupled to the sidewall 166 that is adapted to be mounted to the portable electronic device 10 or to a case or other structure mounted to the device 10. The platform 170 can be secured using a suitable adhesive, for example. With this configuration, a user can secure the platform 170 to the portable electronic device 10 or case so that the transmitter coil 104 is aligned with the receiver coil 14 within the device.

In other versions, the lower portion 110 can be a case 172 including a main wall 174 and one or more sidewalls 176 extending outwardly from edges of the main wall 174. The sidewalls 176 are configured to engage side and/or front surfaces of the device 10 to secure the case 172 thereto. For example, the sidewalls 176 can be inwardly slanted and/or provided with a lip to engage the device 10 and can have resilient and/or flexible configurations for mounting the housing 108 to the device 10, as commonly understood. With this configuration, the main wall 174 extends along and over the device 10 to align the transmitter coil 104 with the receiver coil 14 of the device 10. The case 164 can also be utilized to protect the portable electronic device 10 against physical damage.

The various components of the housing 108 in this form can removably attached to one another. For example, the button 168 and platform 170 or case 172 can include contacts and the sidewall 166 can include corresponding contacts, such that when the sidewall 166 is attached to the button 168 and platform 170 or case 172, the coil member 150 is electrically coupled with the transmitter coil 104 and receiver coil 102, respectively.

With the arrangements provided herein, disposing the wireless charging transfer device 100 between the wireless charger 20 and the portable electronic device 10 to the charging device 100 puts the coil 14 of the electronic device 10 within a charging zone of the transmission coil 124.

Figure 8:
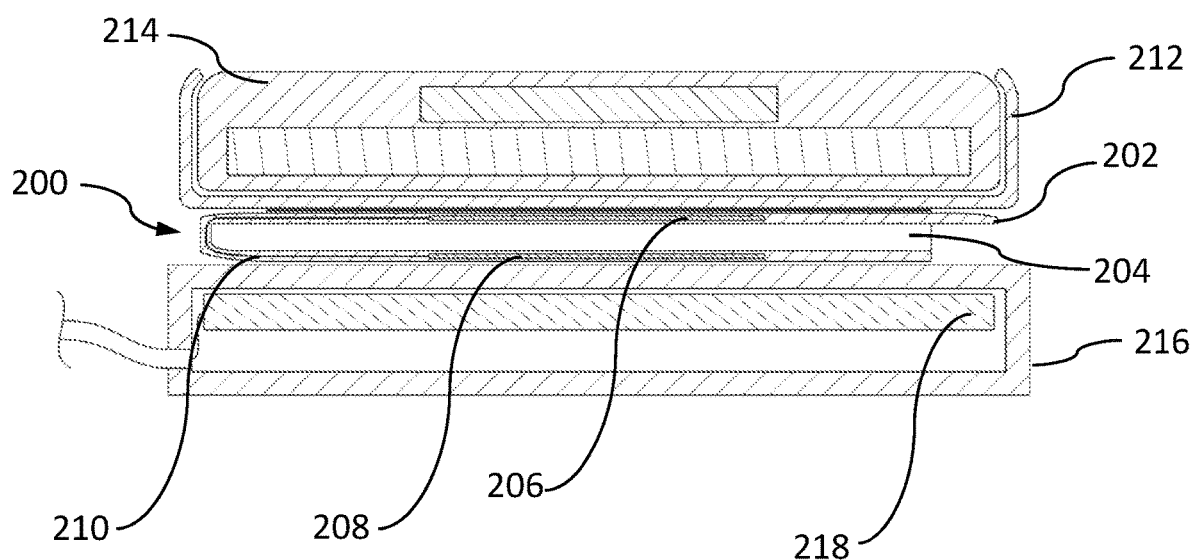
FIG. 8 is a cross-sectional view of the wireless charging arrangement of FIG. 2.
Figure 9:
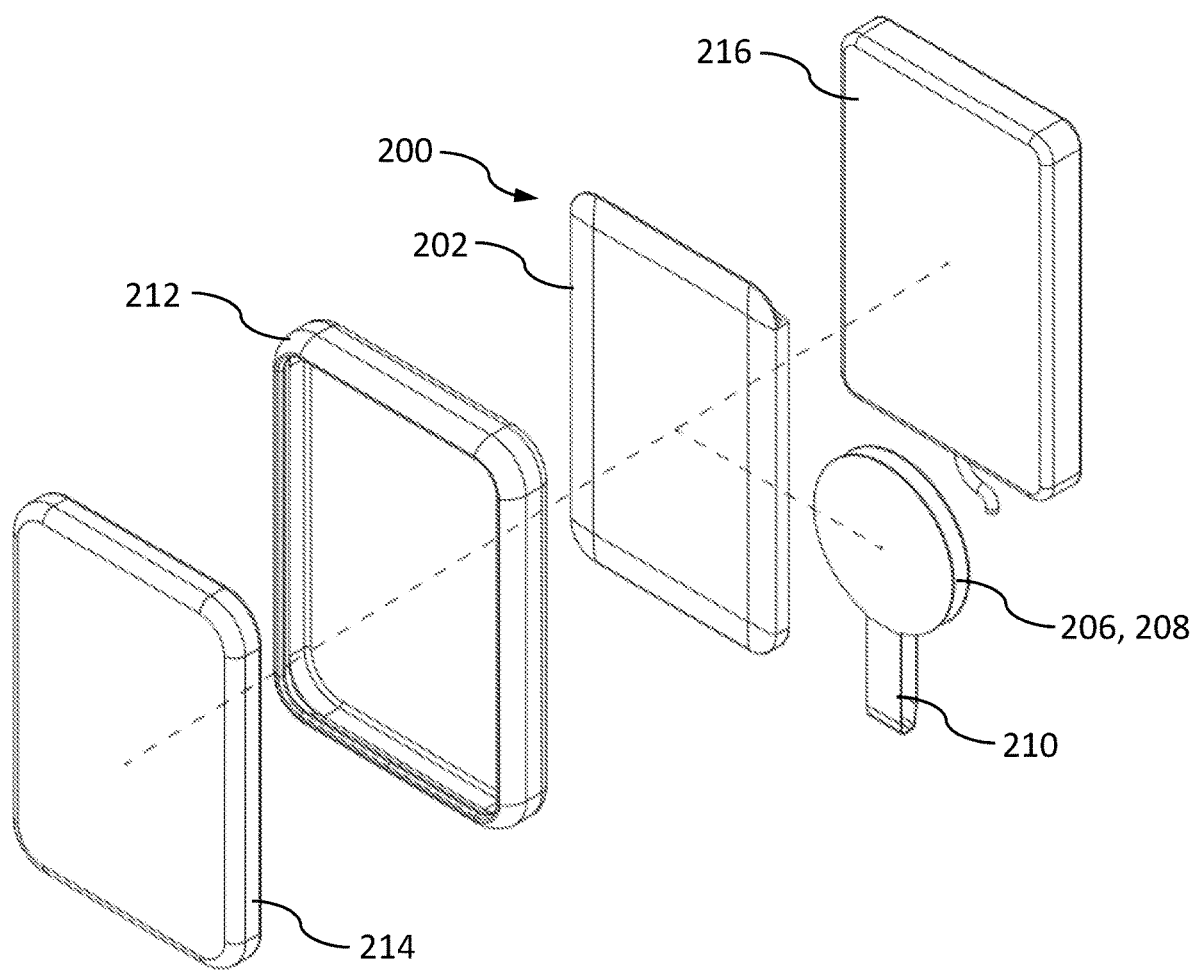
FIG. 9 is an expanded, perspective view of the arrangement of FIG. 8.

FIG. 8 depicts a cross-sectional view of the wireless charging arrangement of FIG. 2, while FIG. 9 depicts an expanded, perspective view of the arrangement of FIG. 8. With reference to FIGS. 8 & 9, a charge-through-wallet 200 comprises a wallet shell 202 forming a contents area 204 (e.g., for holding credit cards with magnetic/rfid, etc.). Coils 206, 208 on flex circuit may be configured with ferrite or suitable signal protection backing, and may be connected via connecting traces 210 on flex circuit. According to this arrangement, mobile electronic device 214, with or without an optional mobile electronic device case 212, may be charged by a wireless charging pad coil 218 of a wireless charging pad 216 (e.g., by induction or resonance) even when the wallet is attached to the mobile electronic device 214, as shown in FIG. 8.

In some instances, the expandable grip accessories of the current disclosure may be in the form of a commercially available grip and stand product such as that manufactured and sold by PopSockets, LLC. For example, U.S. Pat. No. 8,560,031, filed on Feb. 23, 2012; U.S. Pat. No. 9,970,589, filed on Nov. 9, 2017; U.S. Pat. No. 10,019,034, filed Dec. 31, 2014; U.S. Pat. No. 10,054,259, filed on Jun. 7, 2017; U.S. Pat. No. 10,030,807, filed on Mar. 15, 2018; U.S. application Ser. No. 15/679,934, filed on Aug. 17, 2017; U.S. application Ser. No. 15/729,260, filed on Oct. 10, 2017; U.S. application Ser. No. 15/803,410, filed on Nov. 3, 2017; U.S. application Ser. No. 15/808,076, filed on Nov. 9, 2017; U.S. application Ser. No. 15/906,920, filed on Feb. 27, 2018; U.S. application Ser. No. 15/952,025, filed on Apr. 12, 2018; U.S. application Ser. No. 15/993,458, filed on May 30, 2018; and U.S. application Ser. No. 16/001,723, filed on Jun. 6, 2018 each describes suitable expandable grip and stand product, which also incorporates collapsible mechanisms, the entirety of each being hereby incorporated by reference.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A wireless power transfer apparatus for transferring power from a charging transmitter coil to a reception coil in a portable electronic device, the wireless power transfer apparatus comprising:
   a receiver coil;
   a transmitter coil;
   a bridge extending over a gap between and electrically coupling the receiver and transmitter coils to transfer power received at the receiver coil to the transmitter coil; and
   a housing having an upper portion receiving the receiver coil and a lower portion receiving the transmitter coil, wherein the bridge comprises a connector coil having a spiral configuration that is selectively expandable in an axial direction, wherein the connector coil is electrically coupled to the transmitter coil at a radially outer portion thereof and is electrically coupled to the receiver coil at a generally central portion thereof, and wherein the housing further comprises an expandable sidewall extending between the upper and lower housing portions, the connector coil being disposed within an interior of the expandable sidewall.

2. The wireless power transfer apparatus of claim 1, wherein the bridge comprises an electrical path extending between edges of the receiver and transmitter coils.

3. The wireless power transfer apparatus of claim 1, wherein the housing comprises a connection portion extending between the upper and lower portions to receive the bridge therethrough, and a storage area disposed between the upper and lower portions, the storage area having an opening for access thereto.

4. The wireless power transfer apparatus of claim 3, further comprising retention members extending within an interior of the storage area to retain contents inserted into the storage area.

5. The wireless power transfer apparatus of claim 3, further comprising shielding extending along the upper and lower portions and the connection compartment to shield the storage area.

6. The wireless power transfer apparatus of claim 3, wherein the storage area further comprises sidewalls extending between the upper and lower portions; and the opening comprises a lateral opening.

7. The wireless power transfer apparatus of claim 1, wherein the expandable sidewall has a frusto-conical configuration.

8. The wireless power transfer apparatus of claim 1, wherein the upper portion of the housing comprises a button mounted to an end of the expandable sidewall.

9. The wireless power transfer apparatus of claim 1, wherein the lower portion of the housing further comprises one or more walls configured to engage a portable computing device and couple the housing to the portable computing device.

10. The wireless power transfer apparatus of claim 1, wherein the receiver coil is embedded within the upper portion of the housing and the transmitter coil is embedded within the lower portion of the housing.

11. The wireless power transfer apparatus of claim 1, wherein the wireless power transfer apparatus comprises an induction power transfer apparatus.

12. A method for transferring charging power from a transmitting coil of a power supply to a receiving coil of a portable electronic device using, the method comprising:

receiving power from the transmitting coil at a receiver coil of a wireless power transfer device, the receiver coil being disposed within a upper portion of a housing for the wireless power transfer device;

transferring the power to a transmitter coil of the wireless power transfer device through a bridge extending over a gap between the receiver coil and the transmitter coil, the transmitter coil being disposed within a lower portion of the housing; and transmitting the power to the receiving coil of the portable electronic device with the transmitter coil of the wireless power transfer device, wherein transferring the power to the transmitter coil of the wireless power transfer device through the bridge extending over the gap between the receiver coil and the transmitter coil comprises transferring the power to the transmitter coil of the wireless power transfer device through a connector coil with opposite ends electrically coupled to the transmitter and receiver coils, the connector coil having a spiral configuration that is selectively expandable in an axial direction, and further comprising expanding a sidewall of the housing extending between the upper and lower portions thereof, the connector coil being disposed within an interior of the expandable sidewall such that expanding the sidewall causes the connector coil to expand in the axial direction.

13. The method of claim 12, wherein transferring the power to the transmitter coil of the wireless power transfer device through the bridge extending over the gap between the receiver coil and the transmitter coil comprises transferring the power to the transmitter coil of the wireless power transfer device through an electrical path extending between edges of the receiver and transmitter coils.

14. The method of claim 12, further comprising receiving items in a storage area of the housing disposed between the upper and lower portions, the storage area having an opening for access thereto.

15. The method of claim 14, further comprising shielding the storage area with shield members extending along the upper and lower portions.

16. The method of claim 12, further comprising coupling the lower portion of the housing to a portable computing device.

17. The method of claim 12, wherein the wireless power transfer device comprises an induction power transfer device.

* * * * *